United States Patent [19]
de Groot et al.

[11] Patent Number: 5,594,543
[45] Date of Patent: Jan. 14, 1997

[54] LASER DIODE RADAR WITH EXTENDED RANGE

[75] Inventors: Peter de Groot, Bethel; Gregg M. Gallatin, Monroe; Chandra Roychoudhuri, Sandy Hook, all of Conn.

[73] Assignee: Hughes Danbury Optical Systems, Inc., Danbury, Conn.

[21] Appl. No.: 464,797

[22] Filed: Jan. 16, 1990

[51] Int. Cl.$^6$ .................... G01C 3/08; C01P 3/36
[52] U.S. Cl. ...................... 356/5.09; 356/28.5
[58] Field of Search ............... 356/5, 28.5, 4.5, 356/5.09

[56] References Cited

U.S. PATENT DOCUMENTS

| | | | |
|---|---|---|---|
| 4,611,912 | 9/1986 | Falk et al. | 356/28.5 |
| 4,662,741 | 5/1987 | Duvall et al. | 356/28.5 |
| 4,919,532 | 4/1990 | Mocker et al. | 356/28.5 |
| 4,928,152 | 5/1990 | Gerardin | 356/28.5 |

Primary Examiner—Stephen C. Buczinski
Attorney, Agent, or Firm—W. C. Schubert; W. K. Denson-Low

[57] ABSTRACT

An optical radar system includes a laser diode and an external cavity formed by a partial reflector for reflecting a first portion of the laser beam back into the diode. A second portion of the beam is passed out of the external cavity for backscatter thereof from a target back into the diode. The emission thereby has a beat frequency related to the velocity of the target. A frequency chirp is introduced by mechanically oscillating the partial reflector longitudinally resulting in a modulation frequency in the emission corresponding to the range of the target. A photodetector and processor are used to determine the velocity and range.

33 Claims, 1 Drawing Sheet

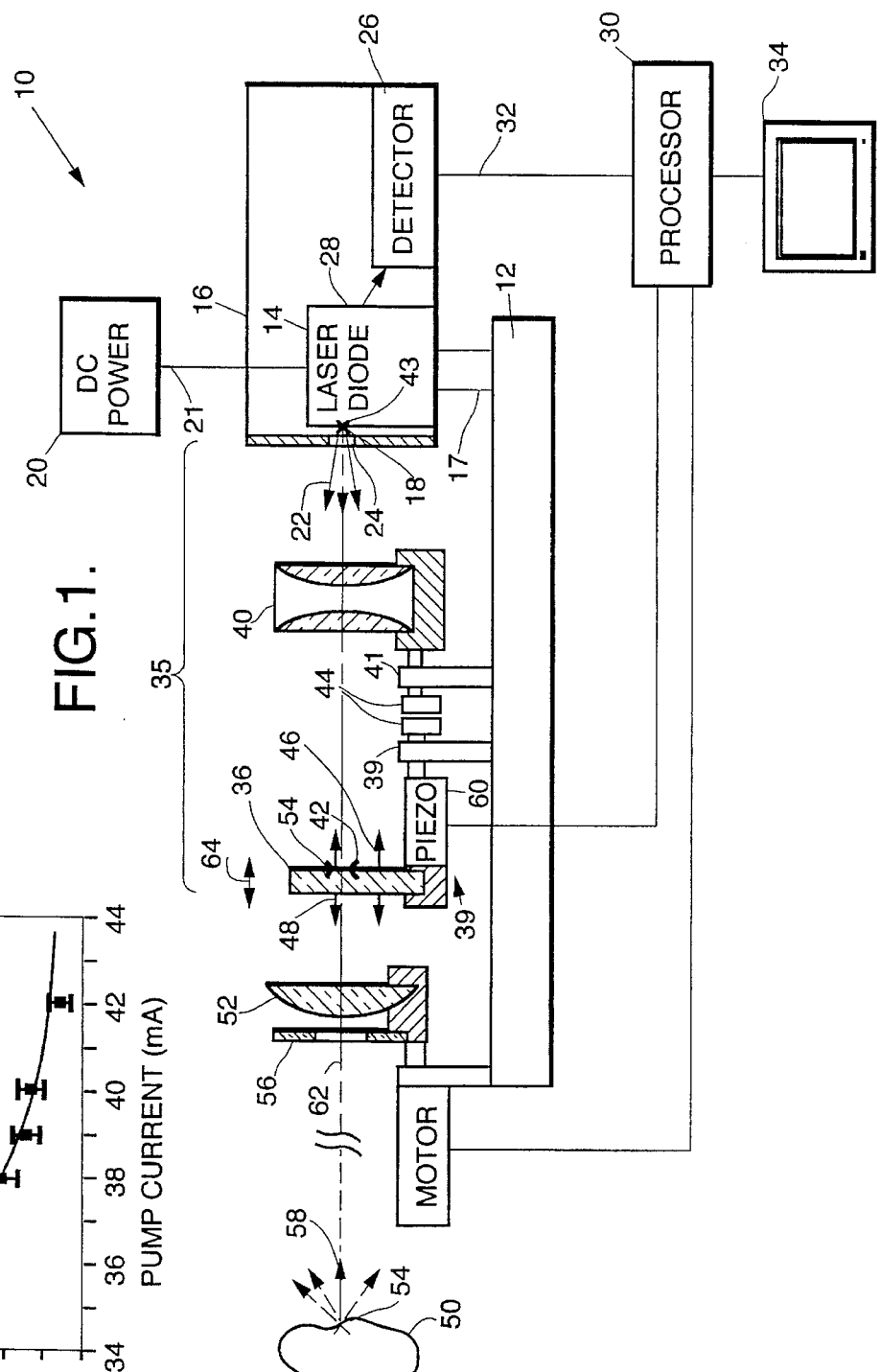
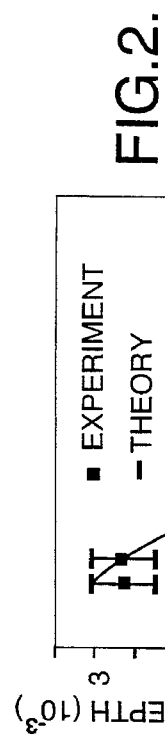

LASER DIODE RADAR WITH EXTENDED RANGE

This invention relates to optical radar, and particularly to a laser diode radar system for measuring range and velocity of a target at extended ranges.

BACKGROUND OF THE INVENTION

Optical radar for ranging and velocimetry became viable with the advent of the laser. In one method of velocity measurement, backscattered light is combined with at least a portion of the laser light to produce a beat frequency that is proportional to the velocity of the backscattering target. As taught in an article "Laser Doppler Velocimeter using the Self-Mixing Effect of a Semiconductor Laser Diode" by S. Shinohara, A. Mochizuki, H. Yoshida and Masao Sumi, Applied Optics 25, 1417 (1989), backscatter feedback into the laser directly alters the laser emission intensity. This allows for small, low power semiconductor laser diodes to be considered for compact radar systems. For example a proximity detector using these principles is disclosed in U.S. Pat. No. 4,733,609 (Goodwin et al). However, the practical range of detection with such systems has been limited to about 3 meters by the coherence length of the laser.

Target range (distance) measurement has been effected with laser diodes by modulating the DC current used to drive the laser diode, as disclosed in an article "Range Finding Using Frequency-modulated Lase Diode" by G. Behiem and K. Fritsh, Applied Optics 25, 1439 (1986). This modulation introduces a so-called chirp frequency into the laser emission. Backscatter from a target, combined with the frequency chirp, introduces an amplitude modulation of the laser output which is used for computing range. The practical operational range, however, is again limited by the coherence length.

Further results of self-coupling of a laser diode to an external reflector are presented in an article "Laser Diode Feedback Interferometer for Stabilization and Displacement Measurements", by T. Yoshino, M. Nara, S. Mnatzakanian, B. S. Lee, and T. C. Strand, Applied Optics 26, 892 (1987). This article is directed toward measurements of alterations to the optical path between the diode and the reflector, including measuring mirror displacement associated with vibration of the mirror.

SUMMARY OF THE INVENTION

An object of the invention is to provide an improved optical radar system based on a laser diode, with an extended range of operation for providing spatial information including distance and velocity of a target object.

The foregoing and other objects are achieved by an optical radar system comprising a laser diode for producing laser emission including a laser beam. An external cavity means includes a partial reflector such as a partially reflective mirror spaced from the laser diode for reflecting a first portion of the beam back into the laser diode. The partial reflector passes a second portion of the beam out of the external cavity so as to allow backscatter of the second portion from a target object back into the laser diode. The emission thereby has a modulation associated with spatial information such as range or velocity of the target object. A photodetector is responsive to the emission for generating a signal representing the modulation. A processor is receptive of the signal for computing the spatial information for the target object.

The cavity means should further include a lens disposed in the beam between the partial reflector and the front facet of the laser diode, the lens having conjugate foci respectively at the partial reflector and the front facet. Also, an objective lens should be positioned for focusing the second portion of the beam on the target object.

In one aspect of the invention the modulation comprises a beat frequency in the emission corresponding to velocity of the target object relative to the laser diode, and the spatial information computed includes the velocity. In another aspect a frequency chirp is effected in the emission such that the modulation comprises a modulation frequency in the emission corresponding to the range of the target object from the laser diode, and the spatial information computed includes the range. The chirp preferably is introduced by mechanically oscillating the partial reflector longitudinally with respect to the beam so that the first portion of the beam reflected into the laser diode effects the frequency chirp in the emission.

The objects are also achieved by a method of measuring spatial information for a target object, using an optical radar system having a laser diode for producing laser emission including a laser beam, and further having an external cavity with a partial reflector spaced from the laser diode. The method comprises reflecting a first portion of the beam from the reflector back into the laser diode, passing a second portion of the beam out of the external cavity to a target object, directing backscatter of the beam from the target object back into the laser diode to effect a modulation of the emission associated with spatial information such as range or velocity on the target object, detecting the modulation, and computing from the modulation the spatial information on the target object.

BRIEF DESCRIPTION OF THE DRAWINGS

FIG. 1 is a schematic drawing, partially in longitudinal section, of an optical radar system according to the invention.

FIG. 2 is a graph illustrating operation of a laser diode component of FIG. 1.

DETAILED DESCRIPTION OF THE INVENTION

With reference to FIG. 1, an optical laser system 10 includes an optical bench 12, or other appropriate support, for mounting other optical components thereon. A semiconductor laser diode 14, such as a Sharp LT015MDO, is contained in a package 16 mounted on a support 17 to the bench. The front facet 18 of the diode should have an anti-reflective coating. A DC power supply 20 provides a suitable DC current on a lead 21 to the laser to cause lasing of the diode at a selected mode of optical frequency, and at a selected power level as described below. Single mode operation of the laser is preferred and may be assured by measuring the spectrum with an optical spectrum analyzer (not shown) which may be removed when parameter are set and the system is in actual use. Coherent emission is emitted, including a main laser beam 22 passed through the front facet of the diode and a window 24 on the package, the beam shown to be emitted in the left-hand direction in the figure.

A photodetector 26, e.g. a silicon P-I-N type, is mounted conventionally behind and slightly below the laser 14, so as to detect a portion of emission emitted from the rear facet Such a detector is normally present in the laser diode package 16. The detector, which may be operated in photovoltaic mode without an additional preamplifier, generates an electrical signal representative of the emission, generally proportional to laser power output. The detector is sufficiently sensitive for the signal to detect one or more modulations of the emission for utilization as described below.

A processor 38 is receptive of the signal on a lead 32 from the detector 26. This processor may be an ordinary analog or digital radio-frequency spectrum analyzer, or an oscilloscope, from which a modulation frequency may be determined. Alternatively, a digital microprocessor is advantageous for providing display of such information on a monitor 34, integrating with other data or producing a signal for feedback.

An external cavity 35 is defined between the front facet 18 of the laser and a partial reflector 36 spaced from the front facet. The reflector is preferably a partially reflective mirror, such as a 40% reflector. Broadly the mirror 36 should be between about 10% and 80% reflective. Alternatively (not shown) the partial reflector may be a fully reflective mirror with an orifice therein, or a full mirror offset from the axis of the laser beam. The reflector 36 is mounted in an assembly 38 with a support 39 to the bench 12.

The external cavity means 35 also includes a lens 48, such as a compound lens with two lens components, also on a support 41 to the bench. The cavity lens 48 is disposed in the beam 22 between the partial reflector 36 and the front facet 18, and has its conjugate foci 42,43 positioned respectively at the partial reflector and the front facet. Advantageously, particularly in a laboratory bench system, the reflector assembly 38 and the cavity lens system 48 have micrometer screw adjustors 44 for fine tuning and orientations transverse and longitudinal positions in the laser beam (only one such screw for each component being shown in FIG. 1).

The partial reflector 36 reflects a first portion 46 of the beam back through the lens 40 into the laser diode 14 to effect a coherent modification of the laser emission. The external cavity 35 thus provides optical feedback as an integral part of the laser emission system.

A second portion 48 of the laser light beam, generally the remainder of the unreflected beam incident on the reflector, is passed through the partial reflector 36 out of the external cavity 35. This portion of the laser beam is directed toward a target object 50 for which spatial information is desired, viz. distance and/or velocity information. If such information is required for a small area of the target, or for optimum sensitivity, an objective lens 52 may be positioned after the reflector 36 to focus the beam 48 on the target 50. In cooperation with the cavity lens 40, focusing of the diode 14 at the target is effected with conjugate foci 42,54 of the objective being positioned respectively at the reflector and the target. A lens stop 56, e.g. 0.4 cm diameter, also may be incorporated. Backscatter 58 of laser light from the target may be expected, and a fraction of this backscatter is directed back into the laser diode 14, via the lens 52 and the cavity 35. The backscatter feedback will effect further modulation of the laser emission.

Velocity is measured basically by Doppler velocimetry, in which backscattered emission is superimposed on the original emission, resulting in an amplitude modulation ("beat frequency") of the basic optical wave. For a target moving at a speed V (relative to the radar device, i.e., longitudinally with respect to the beam), where V is much less that the speed of light, the conventional formula for beat frequency is $f_V=2 V/w$ where w is the wavelength of the laser light. Thus the modulation frequency $f_V$ is a directly proportional measure of the velocity V of the target, the frequency being detected by the detector 26. The beat frequency is a modulation of the laser emission detected by the detector and is represented in the signal on line 32 to the processor 30 for computing velocity.

The sensitivity of this measurement depends on modulation depth which is defined as the ratio of the amplitude of the modulation to the amplitude of the average total optical signal. In prior art optical radar of the Michelson interferometer type, the laser light is divided equally into a reference beam and a beam sent to the target, and the backscattered light is combined with the reference beam. In such a system the modulation depth is $W_H=2$ r (approximately, for small r) where r is the effective reflectivity of a diffusing target including geometric effects and may be less than $10^{-3}$. The reflectivity r therefore is quite small for a distant object, and a simple laser diode radar is limited in range.

Laser power P varies with pump current J from the power supply 20 according to $P=k (J/J_o-1)$ where k is a constant and $J_o$ is threshold current. From this it may be shown that if the reflected light is allowed to enter back into the laser diode so as to modify the laser emission, the revised modulation depth is (approximately) $W_B=[(k/P)+1]$re where e is an efficiency factor of the system, typically about 20%. This formula shows that modulation depth may be increased substantially by laser operation near the threshold current $J_o$.

However, low power operation of a semiconductor laser results in a dramatic reduction of the source-light coherence length and hence of the maximum operational range of the backscatter-modulation velocimeter, such range being about half of the coherence length. Coherence length L is defined conventionally as $L=c/\pi\delta f$, where $\delta f$ is FWHM (full width at half maximum) linewidth and c is light velocity. With the present diode running at 2.5% of its maximum rated power of 30 mW, $\delta f =380$ MFz, and coherence length is about 30 cm. Therefore, for a simple prior art arrangement (no external cavity) the maximum range is only about 15 cm (half of a 30 cm round trip).

It was discovered that, with an external cavity as disclosed herein, the maximum range of the actual target is no longer dependent on the ordinary coherence length, depending only on other factors which are much less significant. The cavity length (between facet 22 and reflector 36) should be as long as practical but less than a critical distance that could allow mode shifting or other significant multimode operation. Too long a cavity can cause multi-mode operation even with a single-mode type of laser diode with optimum driving current. However, if more compactness is desired without a need for maximum target range or sensitivity, the cavity may be made shorter. Generally for conventional single-mode laser diodes the cavity length should be between 1 cm and 15 cm, and preferably between about 10 and 14 cm. A length of 13 cm was found to be quite suitable for the aforementioned Sharp diode.

Generally the system will operate in a stable mode, substantially single-mode, with the optical laser frequency locking into a resonant frequency of the cavity. A significant change in cavity length may cause a change in optical frequency mode. If the resonant frequency of the cavity is nearly equal to a natural laser frequency there may be a tendency for mode switching. This may be avoided if desired by changing the diode current or the cavity length, or both in synchronous tuning, sufficiently to correct the instability. Alternatively electronic feedback with a lock-in amplifier or the like may be incorporated, as taught in the aforementioned article by Yoshino et al.

Utilizing an external cavity composed of two lenses near the diode with a combined focal length of 8.6 mm and 0.5 numerical aperture, and a 40% reflector placed 13 cm from a Sharp LT015MDO laser diode emitting at a frequency of $3.615 \times 10^{14}$ Hz, the external cavity reduced threshold current level from 43 to 35 MA. The target was a rough surface of a rotating disk, tilted to provide a constant 40 kHz signal. With the laser biased at 38 mA for 0.75 mW average power output, velocimetry was performed at a distance of up to 50 m using six flat mirrors to fold the beam, corresponding to a new coherence length of 100 m and a linewidth of 1 MHz. This was an improvement of more than 2 orders of magnitude over laser operation without an external cavity, and the demonstrated range was 25 times greater than previously achieved for diode-based backscatter modulation.

The modulation depth as a function of pump current is given in FIG. 2, for a target distance of 2 m and effective reflectivity $r = 5 \times 10^{-4}$. The modulation depth is considerably enhanced at currents near the threshold level of 35 MA, being 30 times larger than the high-current limit of $9 \times 10^{-5}$ and considerably larger than the prior limit of $1 \times 10^{-3}$ calculated from WH=2 r. The theory plot is fitted by adjustment of the coupling efficiency coefficient to e=18%. Useful signals have been observed with integrated backscatter power at the objective lens of less than 10 pW.

In a another embodiment the spatial information measured with the optical radar system of the invention is the range of the target object, i.e. its distance from the diode. For this purpose a "chirp" frequency modulation is introduced into the emission, preferably as a triangular wave. The system 18 further comprises a mechanical oscillator such as a piezoelectric device 68 (e.g. Burleigh PZT translator) on which the partial reflector 36 is mounted to the optical bench. This oscillates the reflector longitudinally with the beam (i.e. parallel to the axis 62) as indicated by the arrows 64; for example a reflector 10 cm from the diode is oscillated over a range of about 1 micron at 20 Hz. Control of the oscillator may be effected from the processor via a line.

The oscillation causes the first portion of the beam reflected into the laser diode to effect a frequency chirp in the emission. A chirp alternatively may be generated by modulating the laser driving current, but mechanical oscillation of the reflector is highly preferable according to the invention because the external cavity interferes via its discrete resonant frequencies.

The backscatter feedback from the target and the chirp together cause the emission to have another modulation frequency $f_r = AR$ corresponding to a range R of the target object from the laser diode, where A is a parameter associated with the system operation. In this case the modulation comprises the chirp-induced modulation frequency, and the spatial information computed includes the distance (range) of the target from the diode. The range is computed easily from the frequency modulation in the laser emission.

The parameter $A = (2f/cx)(dx/dt)$ where f is the optical frequency, x is cavity length, and dx/dt refers to the slope of the triangular wave oscillation of the reflector. The parameter is readily determined empirically by observing the modulation frequency $f_r$ for a known target distance. As pointed out above it may be necessary to tune the system to prevent mode switching. Also, the chirp frequency may be detected but is not necessarily of direct interest and may be discarded by the processor.

A system breadboard for range was composed of a 40 mW (maximum rated power) index-guided diode, a 8.6 mm focal length, 0.5 numerical aperture lens 48, a piezo-actuated external cavity mirror of 40% reflectively, and a 750 mm focal length simple lens 52 of 18 mm clear aperture. The 10 cm external cavity length was varied over 0.6 microns at 20 Hz using a piezoelectric transducer driven by a triangle-wave voltage modulation. A spectrum analyzer measured the frequency content of the signal produced by the photodetector. The diode was operated near threshold, to take advantage of the modulation-depth enhancement. The integrated output power of the radar breadboard under these conditions was 0.5 mW.

Despite the low power level and the small size (18 mm) of the collection aperture 56, the radar operated reliably for a wide variety of target materials up to 20 m. Measurements were made at distances of 40 m using non-specular metallic targets, such as anodized aluminum. Range measurement (R) showed excellent linearity with modulation frequency ($f_r$) over entire spread of distances. Measurement accuracy for laboratory demonstration was about 3%, with the principle source being the variation in the optical frequency ramp rate (df/dt), which was sensitive to mechanical vibrations and small changes in the diode temperature.

As indicated above the system is more sensitive with the objective lens focusing the reflector plane on the target. Refocusing may be desirable for a moving target, and the range measurement allows this. A motorized micrometer is affixed in the objective mount to position the objective longitudinally. A signal on a line from the processor drives the micrometer to position the objective lens according to range information generated in the processor, maintaining focus of the second portion of the beam on the target. Thus even if velocity is the only desired information, range measurement with focussing feedback may be advantageous. As a further alternative, only range may be measured, and velocity calculated from successive range measurements.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. An optical radar system with an extended range, comprising:

a laser diode for producing laser emission including a laser beam;

external cavity means receptive of the beam, including a partial reflector spaced from the laser diode for reflecting a first portion of the beam back into the laser diode, the partial reflector passing a second portion of the beam out of the external cavity so as to allow backscatter of the second portion from a target object back through the partial reflector into the laser diode, whereby the emission has a modulation associated with spatial information on the target object;

a photodetector responsive to the emission for generating a signal representing the modulation; and processing means receptive of the signal for computing the spatial information.

2. The optical radar system according to claim 1 wherein the laser diode has an front facet for passing the beam from the diode, and the cavity means further includes a lens disposed in the beam between the partial reflector and the front facet, the lens having conjugate foci respectively at the partial reflector and the front facet.

3. The optical radar system according to claim 1 wherein the partial reflector comprises a partially reflective mirror.

4. The optical radar system according to claim 1 wherein the laser diode is a single-mode type laser diode, the system further comprises power supply means for driving the laser diode in substantially single mode operation, and the partial reflector is spaced from the laser diode by a cavity distance less than a critical distance of multimode operation.

5. The optical radar system according to claim 4 wherein the cavity distance is between about 1 cm and 15 cm.

6. The optical radar system according to claim 1 further comprising objective means for focusing the second portion of the beam on the target object.

7. The optical radar system according to claim 6 wherein the laser diode has an front facet for passing the beam from the diode, and the cavity means further includes a lens disposed in the beam between the partial reflector and the front facet, the lens having conjugate foci respectively at the partial reflector and the front facet and the objective means comprises an objective lens with conjugate foci positioned respectively at the partial reflector and the target object.

8. The optical radar system according to claim 1 wherein the modulation comprises a beat frequency in the emission corresponding to velocity of the target object relative to the laser diode, and the spatial information computed includes the velocity.

9. The optical radar system according to claim 8 further comprising chirp means for effecting a frequency chirp in the emission such that the emission has a further modulation associated with spatial information on the target object, the further modulation being a modulation frequency in the emission corresponding to range of the target object from the laser diode, and the spatial information computed further includes the range.

10. The optical radar system according to claim 9 wherein the chirp means comprises oscillator means for mechanically oscillating the partial reflector longitudinally with respect to the beam so that the first portion of the beam reflected into the laser diode effects the frequency chirp in the emission.

11. The optical radar system according to claim 9 further comprising focusing means receptive of the spatial information on distance for focusing the second portion of the beam on the target object.

12. The optical radar system according to claim 1 further comprising chirp means for effecting a frequency chirp in the emission such that the modulation comprises a modulation frequency in the emission corresponding to range of the target object from the laser diode, and the spatial information computed includes the range.

13. The optical radar system according to claim 12 wherein the chirp means comprises oscillator means for mechanically oscillating the partial reflector longitudinally with respect to the beam so that the first portion of the beam reflected into the laser diode effects the frequency chirp in the emission.

14. The optical radar system according to claim 12 further comprising focusing means receptive of the spatial information on distance for focusing the second portion of the beam on the target object.

15. A method of measuring spatial information on a target object, comprising:

providing an optical radar system having a laser diode for producing laser emission including a laser beam, and further having an external cavity with a partial reflector spaced from the laser diode, the external cavity being receptive of the beam;

reflecting a first portion of the beam from the reflector back into the laser diode;

passing a second portion of the beam out of the external cavity to a target object;

directing backscatter of the beam from the target object back through the partial reflector into the laser diode to effect a modulation of the emission associated with spatial information on the target object;

detecting the modulation; and computing from the modulation the spatial information on the target object.

16. The method according to claim 15 wherein the laser diode has a front facet for passing the beam from the diode, and the external cavity has therein a lens disposed in the beam between the partial reflector and the front facet, the lens having conjugate foci positioned respectively at the partial reflector and the front facet.

17. The method according to claim 15 wherein the partial reflector comprises a partially reflective mirror.

18. The method according to claim 1 wherein the laser diode is a single-mode type laser diode, and the method further comprises providing a driver current so as to operate the laser diode in substantially single mode operation, and spacing the partial reflector from the laser diode by a cavity distance less than a critical distance of multimode operation.

19. The method according to claim 18 wherein the cavity distance is between about 1 cm and 15 cm.

20. The method according to claim 18 further comprising operating the laser diode with a current near threshold current.

21. The method according to claim 20 wherein the current is such as to operate the laser diode between about 1% and 5% of rated power.

22. The method according to claim 15 further comprising operating the laser diode with a current near threshold current.

23. The method according to claim 22 wherein the current is such as to operate the laser diode between about 1% and 5% of rated power.

24. The method according to claim 15 further comprising focusing the second portion of the beam on the target object.

25. The method according to claim 15 wherein the modulation comprises a beat frequency in the emission corresponding to velocity of the target object relative to the laser diode, and the spatial information computed includes the velocity.

26. The method according to claim 25 further comprising effecting a frequency chirp in the emission such that the emission has a further modulation associated with spatial information on the target object, the further modulation being a modulation frequency in the emission corresponding to range of the target object from the laser diode, and the spatial information computed further includes the range.

27. The optical radar system according to claim 26 wherein the step of effecting a frequency chirp comprises mechanically oscillating the partial reflector longitudinally with respect to the beam so that the first portion of the beam reflected into the laser diode effects the frequency chirp.

28. The method according to claim 27 further comprising utilizing the spatial information on the range for focusing the second portion of the beam on the target object.

29. The method according to claim 15 further comprising effecting a frequency chirp in the emission such that the modulation comprises a modulation frequency in the emission corresponding to a range of the target object from the laser diode, and the spatial information computed further includes the distance.

30. The method according to claim 29 wherein the step of effecting a frequency chirp comprises mechanically oscillating the partial reflector longitudinally with respect to the beam so that the first portion of the beam reflected into the laser diode effects the frequency chirp.

31. The method according to claim 29 further comprising utilizing the spatial information on the range for focusing the second portion of the beam on the target object.

32. The optical radar system according to claim 1 wherein the photodetector is disposed to receive a portion of the emission separate from the beam.

33. The method according to claim 15 wherein the modulation is detected by a photodetector disposed to receive a portion of the emission separate from the beam.

* * * * *